United States Patent
Hoffman

(10) Patent No.: US 7,283,608 B2
(45) Date of Patent: Oct. 16, 2007

(54) SYSTEM AND METHOD FOR X-RAY IMAGING USING X-RAY INTENSITY INFORMATION

(75) Inventor: David Michael Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/924,615

(22) Filed: Aug. 24, 2004

(65) Prior Publication Data

US 2006/0045236 A1   Mar. 2, 2006

(51) Int. Cl.
*A61B 6/03* (2006.01)
*H05G 1/64* (2006.01)

(52) U.S. Cl. ........................ 378/19; 378/98.8
(58) Field of Classification Search ............... 378/98.8, 378/19, 5, 98.9; 250/370.09, 366, 367
See application file for complete search history.

(56) References Cited

U.S. PATENT DOCUMENTS

| | | | |
|---|---|---|---|
| 4,429,227 A * | 1/1984 | DiBianca et al. | 250/370.09 |
| 4,870,279 A | 9/1989 | Cueman et al. | |
| 4,937,453 A * | 6/1990 | Nelson | 250/370.09 |
| 5,355,309 A * | 10/1994 | Eberhard et al. | 378/19 |
| 5,379,336 A | 1/1995 | Kramer et al. | |
| 5,440,130 A | 8/1995 | Cox et al. | |
| 5,510,623 A * | 4/1996 | Sayag et al. | 250/370.09 |
| 5,907,593 A * | 5/1999 | Hsieh et al. | 378/4 |
| 6,069,361 A * | 5/2000 | Rubinstein | 250/370.11 |
| 6,674,837 B1 | 1/2004 | Taskar et al. | |
| 6,895,077 B2 * | 5/2005 | Karellas et al. | 378/98.3 |

FOREIGN PATENT DOCUMENTS

DE       19854470 A1 *  5/1999

* cited by examiner

*Primary Examiner*—Chih-Cheng G Kao
(74) *Attorney, Agent, or Firm*—Armstrong Teasdale LLP

(57) ABSTRACT

Systems and methods for X-ray imaging are provided. The X-ray imaging system includes an X-ray source for generating X-rays. The X-ray imaging system further includes an X-ray detector configured to provide X-ray intensity variation information relating to the X-rays and corresponding to each of a plurality of detector cells of the X-ray detector.

18 Claims, 6 Drawing Sheets

SYSTEM AND METHOD FOR X-RAY IMAGING USING X-RAY INTENSITY INFORMATION

BACKGROUND OF THE INVENTION

This invention relates generally to X-ray imaging systems, and more particularly, to X-ray detectors.

X-ray imaging systems use X-ray detectors to form an image of an object that is being scanned. X-ray detectors typically use a single sensing layer composed of a scintillator layer and a photodiode layer to form an image of the object. Both the layers are divided into a number of cells. The combination of a scintillator cell and a photodiode cell forms an X-ray detector cell. A number of such X-ray detector cells are combined to form the X-ray detector. When an X-ray falls on a scintillator cell, the scintillator cell emits visible light. The intensity of the emitted light is proportional to the intensity of the X-ray. The emitted light is directed towards a photodiode cell. The photodiode cell converts the light into an electrical signal. The amplitude of the electrical signal is proportional to the intensity of the light incident on the photodiode cell.

The resolution of an image obtained after scanning an object depends on the size of the X-ray detector cell, the complexity of the interconnect for these cells and the associated electronics. One technique to increase the resolution of scanned images is to reduce the size of the X-ray detector cells. However, the reduction in the size of the X-ray detector cells increases the cost and complexity of the X-ray imaging system.

BRIEF DESCRIPTION OF THE INVENTION

In an exemplary embodiment, an X-ray imaging system is provided. The X-ray imaging system includes an X-ray source for generating X-rays. The X-ray imaging system further includes an X-ray detector configured to provide X-ray intensity variation information relating to the X-rays and corresponding to each of a plurality of detector cells of the X-ray detector.

In another exemplary embodiment, a method for controlling X-ray imaging is provided. The method includes configuring at least a first layer of a detector of an X-ray imaging system to provide X-ray intensity mapping information corresponding to each of a plurality of cells of the detector. The method further includes configuring at least a second layer of the detector to provide X-ray energy information.

DETAILED DESCRIPTION OF THE INVENTION

Various embodiments of the invention provide an X-ray imaging system and a method for controlling thereof. The X-ray imaging system can be in the form of, for example, a Computed Tomography (CT) system. The X-ray imaging system generally includes an X-ray source for generating X-rays and an X-ray detector. The X-ray detector further includes a plurality of detector cells that provide high-resolution images.

Figure 1:
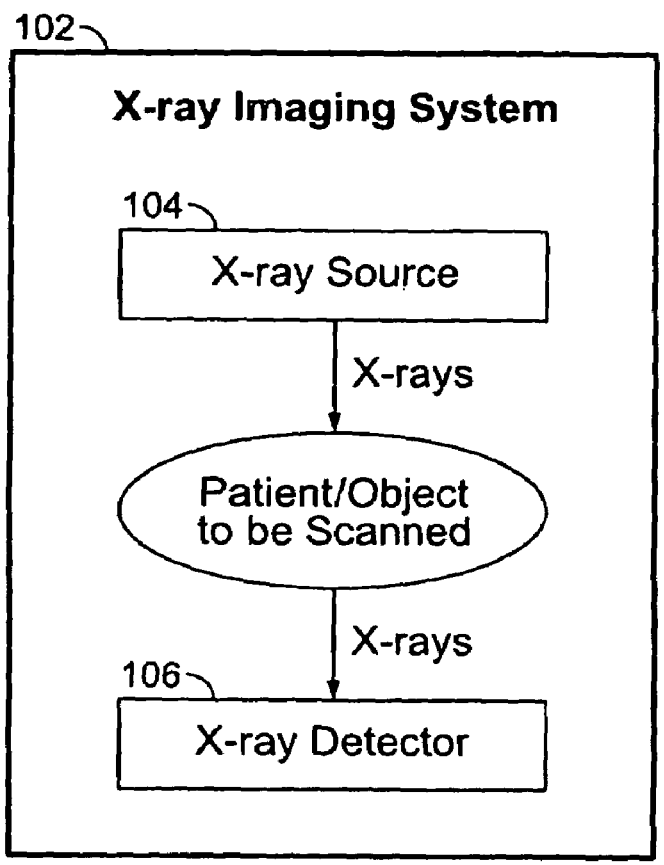
FIG. 1 is a block diagram of an X-ray imaging system in accordance with an exemplary embodiment of the invention.

Specifically, FIG. 1 is a block diagram of an X-ray imaging system 102 in accordance with an exemplary embodiment of the invention. X-ray imaging system 102 includes an X-ray source 104 and an X-ray detector 106. An X-ray tube is one example of X-ray source 104. X-ray detector 106 includes a plurality of detector cells, which are arranged to form a two-dimensional array. In an embodiment of the invention, X-ray detector 106 is curvilinear in shape. In operations, X-rays originate from X-ray source 104 and pass through an object to be scanned. X-rays passing through the object along an X-ray penetration axis then fall on X-ray detector 106. X-ray detector 106 forms an image of the object either by exposing an X-ray sensitive film to the X-rays or by converting the intensity of the X-rays into corresponding electrical signals that relate to the X-ray intensity variation information of the X-rays.

Figure 2:
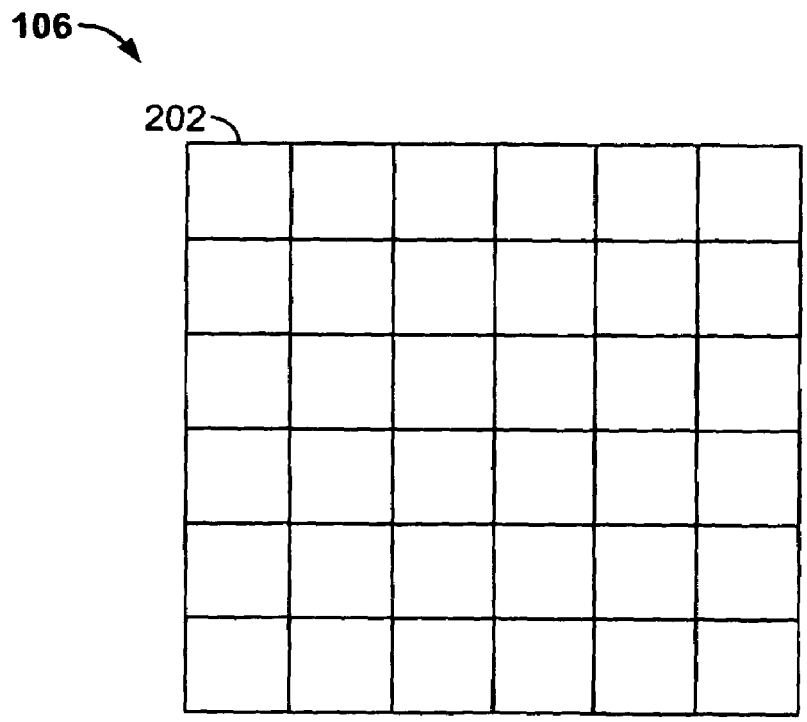
FIG. 2 is a block diagram of an X-ray detector in accordance with an exemplary embodiment of the invention.

FIG. 2 is a block diagram of an X-ray detector 106 in accordance with an exemplary embodiment of the invention. X-ray detector 106 is pixelated and forms a plurality of X-ray detector cells 202. X-ray detector cells 202 are arranged to form a two dimensional matrix. The two dimensional matrix of X-ray detector cells 202 is arranged to capture X-rays that pass through the object to be scanned. In an embodiment, each X-ray detector cell 202 is similar in construction, and has same size and shape. In another embodiment, each X-ray detector cell 202 varies in shape and size.

Figure 3:
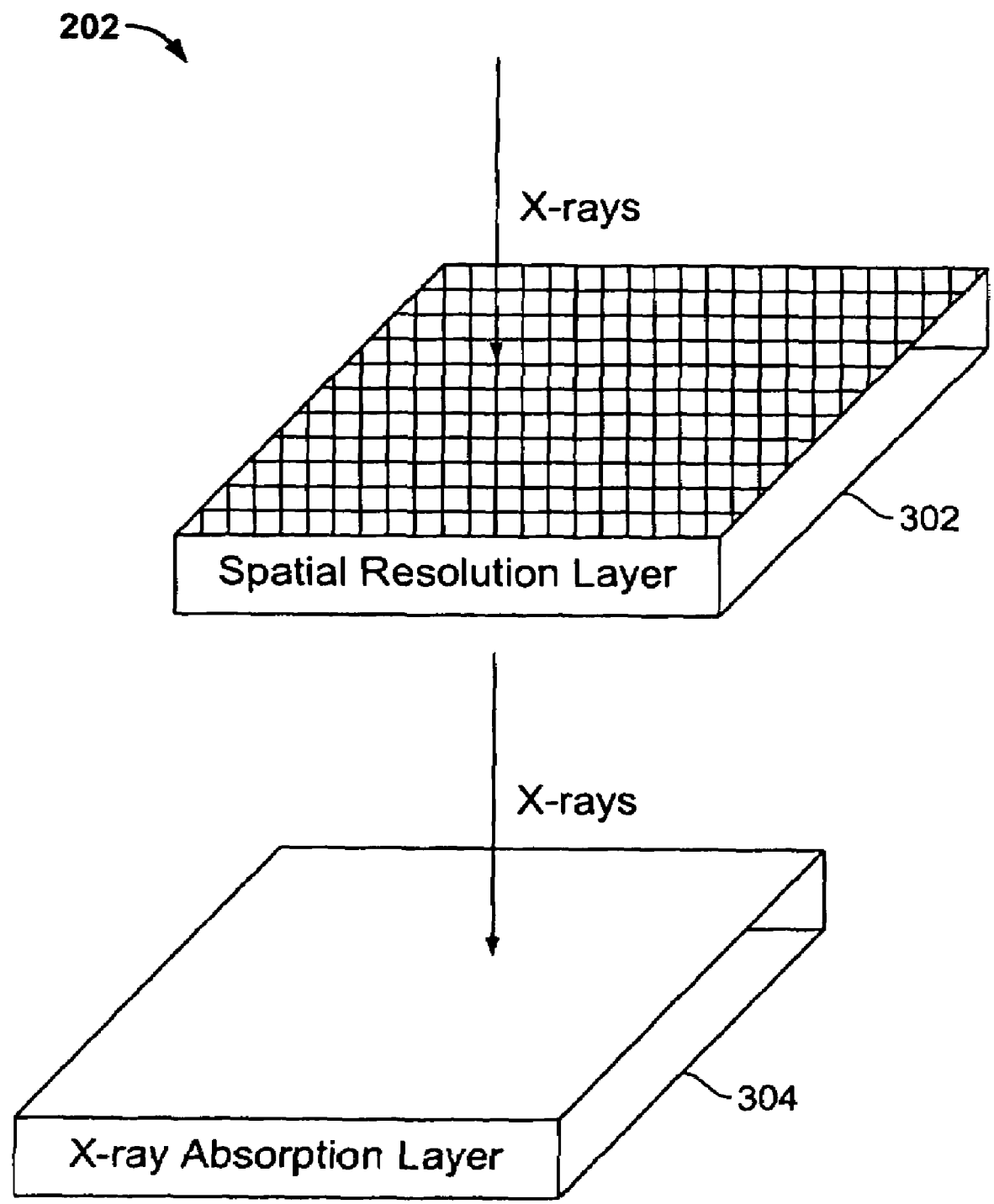
FIG. 3 is a block diagram of an X-ray detector cell arrangement in accordance with an exemplary embodiment of the invention.

FIG. 3 is a block diagram of an X-ray detector cell 202 in accordance with an exemplary embodiment of the invention. X-ray detector cell 202 includes a spatial resolution layer 302 and an X-ray absorption layer 304. Spatial resolution layer 302 is sub-pixelated, (e.g., further divided into a two dimensional array of smaller cells). Spatial resolution layer 302 provides high-resolution X-ray detection mapping information X-rays falling on spatial resolution layer 302. Spatial resolution layer 302 provides the location of the X-rays falling on its surface. Because spatial resolution layer 302 is sub-pixelated, it provides mapping information corresponding to the location of X-rays falling on its surface. Spatial resolution layer 302 absorbs, for example, about 1-25% of the X-rays falling on its surface.

It should be noted that when reference is made herein to X-rays falling on a surface, this refers generally to X-rays impinging on or incident to the surface.

X-ray absorption layer 304 is used to obtain information relating to the intensity of the X-rays falling on its surface.

This information is also used for imaging the object being scanned. This information is combined with the information obtained from spatial resolution layer 302 to obtain a high-resolution image of the object.

Figure 4:
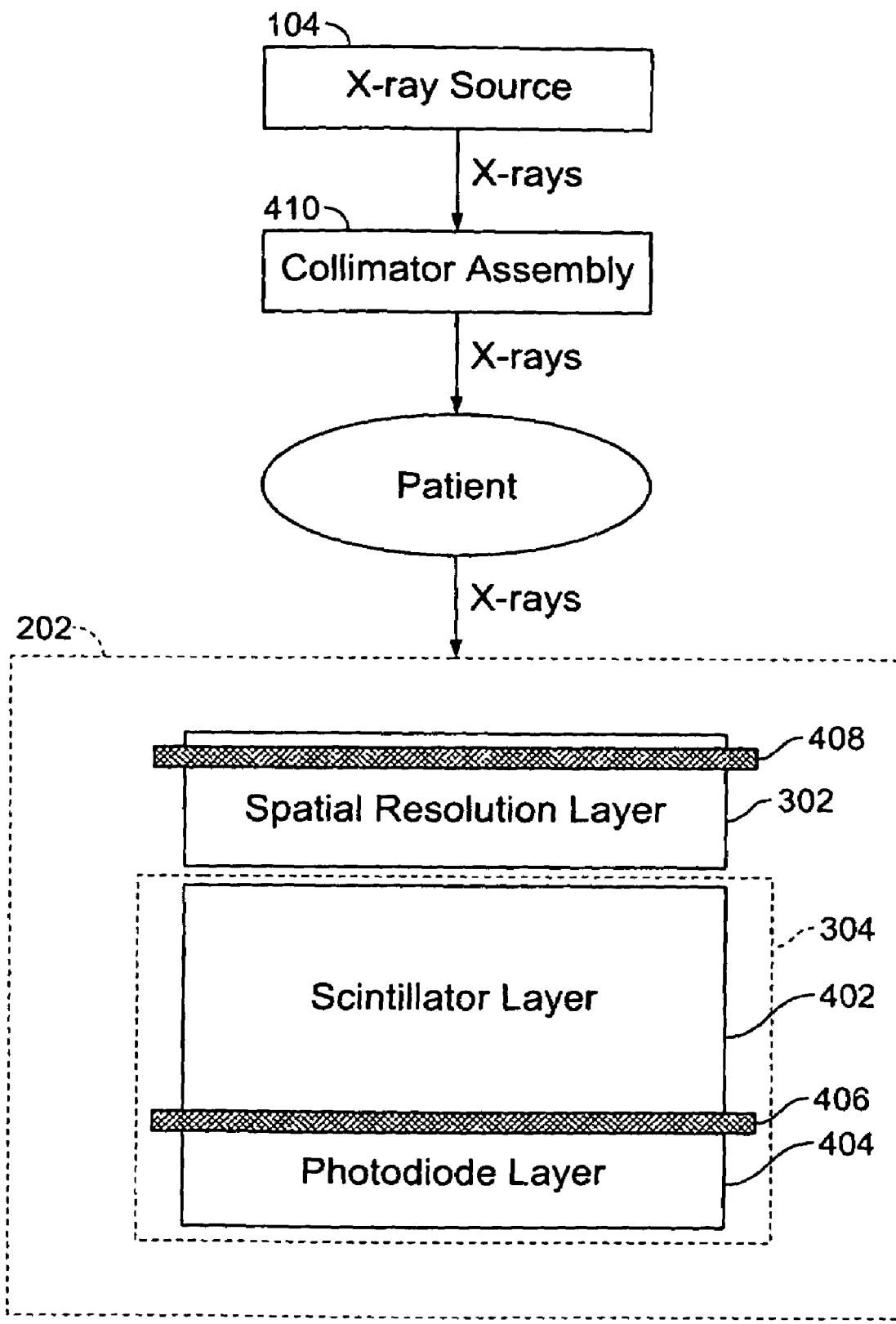
FIG. 4 is a block diagram of an X-ray imaging system in accordance with another exemplary embodiment of the invention.

FIG. 4 is a block diagram of an X-ray imaging system 102 in accordance with another exemplary embodiment of the invention. X-ray imaging system 102 includes X-ray source 104 and a plurality of X-ray detector cells 202. Each of the plurality of X-ray detector cells 202 includes spatial resolution layer 302 and X-ray absorption layer 304. X-ray absorption layer 304 further includes a scintillator layer 402 and a photodiode layer 404. X-ray detector cell 202 also includes a plurality of interconnection layers 406 and 408. In an embodiment, interconnection layers 406 and 408 can be located in a number of planes within X-ray detector cell 202. These planes are generally perpendicular to the direction of the incoming X-rays. X-ray imaging system 102 further includes a collimator assembly 410. In an embodiment of the invention, X-ray detector cell 202 is arranged such that spatial resolution layer 302 is closer to the object being scanned than X-ray absorption layer 304, along the X-ray penetration axis. X-rays originating from X-ray source 104 pass through the object to be scanned and fall on spatial resolution layer 302 after passing through collimator assembly 410. Collimator assembly 410 eliminates X-rays that are scattered by the object to be scanned.

Spatial resolution layer 302 acquires the mapping information of the X-rays falling on it. The spatial resolution layer 302 acquires mapping information based on the sub-pixealtion of the layer sub-pixelated. Thus, higher resolution, or effectively smaller cell information is acquired and may be used to sub-divide the signal or charge, which is detected in the X-ray absorption layer 304. Spatial resolution layer 302 absorbs about 1-25% of the X-rays falling on it. The remaining X-rays pass through and fall on scintillator layer 402. Scintillator layer 402 absorbs the X-rays and converts the energy of the absorbed X-rays into visible light as is known. The intensity of the emitted light depends on the intensity of the absorbed X-ray. Scintillator layer 402 is surrounded by reflectors to ensure that the light is emitted along a single axis. The light emitted by scintillator layer 402 is directed towards photodiode layer 404. Photodiode layer 404 absorbs the light and generates an electrical signal corresponding to the intensity of the absorbed light. This electrical signal along with the mapping information generated by spatial resolution layer 302 is processed by X-ray imaging system 102 to generate an image of the scanned object.

Interconnection layer 406 connects electrical connecters originating from photodiode layer 404 to a data acquisition system (not shown). The data acquisition system is used to acquire electrical signals from photodiode layer 404 and convert the electrical signals into an image of the object being scanned as is known. Interconnection layer 408 connects electrical connecters originating from spatial resolution layer 302 to the data acquisition system. For a single X-ray detector cell 202, the number of electrical connecters is less for a high resolution detector with a fully pixelated arrangement with many small cells. However, when a large number of X-ray detector cells 202 are placed adjacent to each other, the number of electrical connecters becomes very large. Hence, interconnection layers 406 and 408 are provided to manage the number of connecters. In an embodiment, there can be, for example, 500-1000 cells per CT slice. Hence, for a four slice detector there are 4×(500-1000) cells in total. Interconnection layers 406 and 408 can be implemented using, for example, flex circuits, printed wiring boards, printed circuit boards or equivalents.

In an embodiment of the invention, spatial resolution layer 302, scintillator layer 402 and photodiode layer 404 are aligned such that one or more cells on spatial resolution layer 302 is aligned with one or more corresponding cells on scintillator layer 402 and photodiode layer 404.

In another embodiment of the invention, spatial resolution layer 302, scintillator layer 402 and photodiode layer 404 are stacked on top of each other. In yet another embodiment of the invention, spatial resolution layer 302, scintillator layer 402 and photodiode layer 404 are arranged such that there is a gap (e.g., air gap) between each layer. The gap between each layer may be adjusted manually or electronically, for example, by a computer program.

Figure 5:
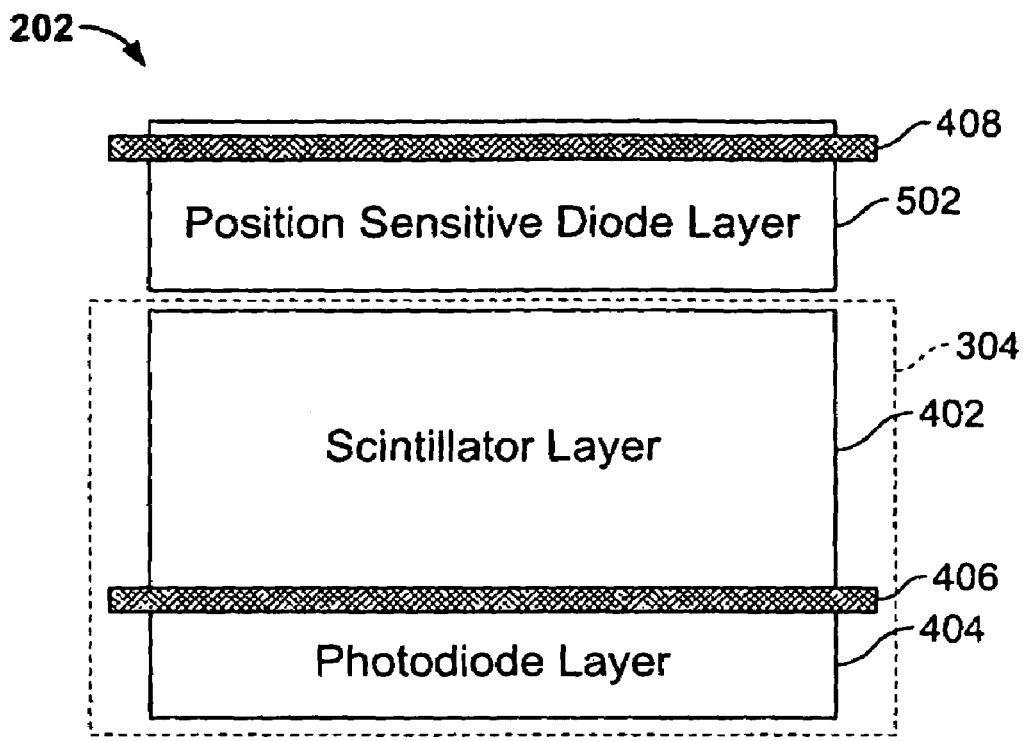
FIG. 5 is a block diagram of an X-ray detector cell in accordance with an exemplary embodiment of the invention.

FIG. 5 is a block diagram of an X-ray detector cell 202 in accordance with an exemplary embodiment of the invention. In this embodiment, spatial resolution layer 302 is in the form of a position sensitive diode layer 502. Position sensitive diode layer 502 provides an analog output that corresponds to the location of an X-ray falling on it.

Figure 6:
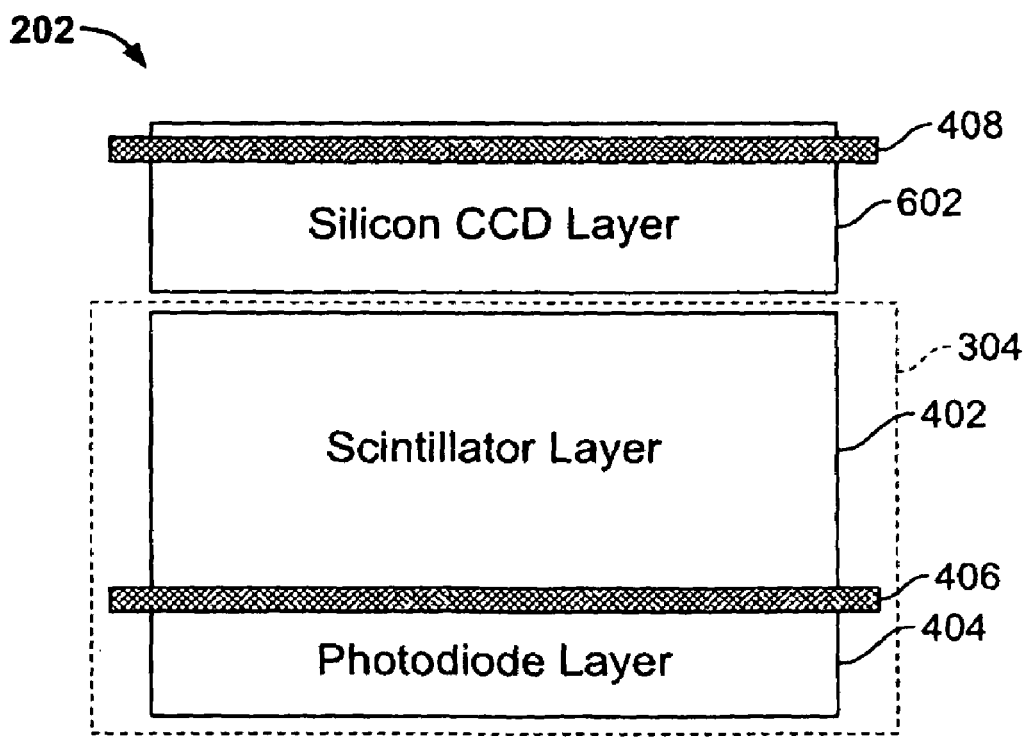
FIG. 6 is a block diagram of an X-ray detector cell in accordance with another exemplary embodiment of the invention.

FIG. 6 is a block diagram of an X-ray detector cell 202 in accordance with another exemplary embodiment of the invention. In this embodiment, spatial resolution layer 302 is in the form of a Silicon Charge Coupled Device (CCD) layer 602. Silicon CCD layer 602 is divided into a two dimensional array of pixels. Silicon CCD layer 602 provides a serial output indicative of the X-rays falling on each of its pixels.

Figure 7:
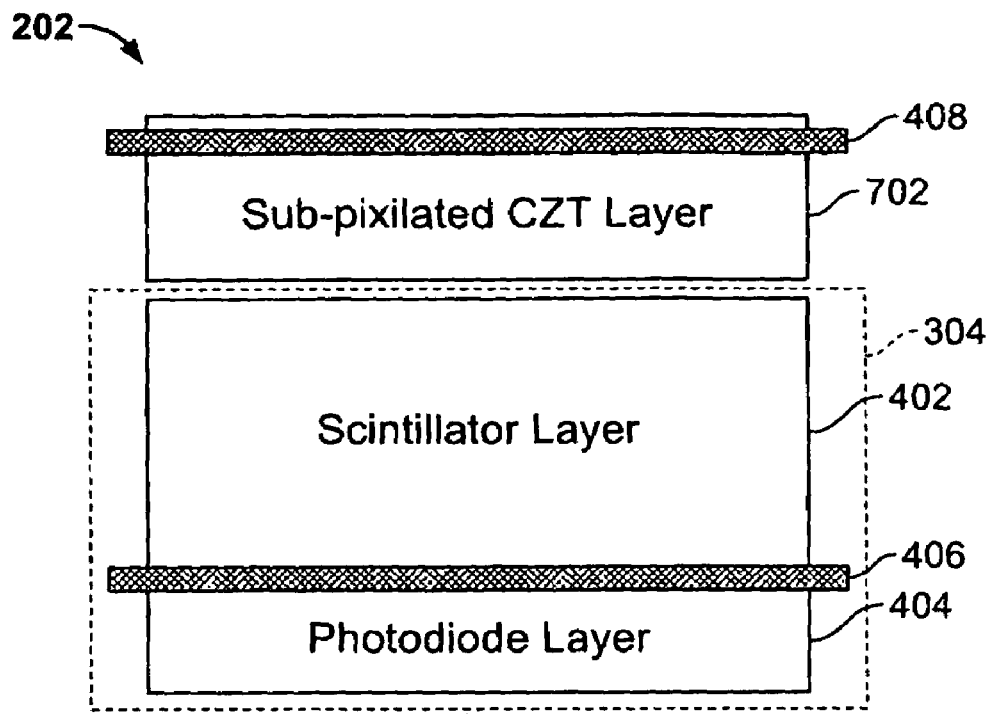
FIG. 7 is a block diagram of an X-ray detector cell in accordance with another exemplary embodiment of the invention.

FIG. 7 is a block diagram of an X-ray detector cell 202 in accordance with another exemplary embodiment of the invention. In this embodiment, a direct conversion semiconductor material, such as, for example, a sub-pixelated multiplexed Cadmium Zinc Telluride (CZT) layer 702, is used to form spatial resolution layer 302. CZT layer 702 used in each X-ray detector cell 202 includes a plurality of CZT cells. When an X-ray beam falls on an individual CZT cell, the cell converts the X-ray into an electrical signal as an output. The output is multiplexed with the output of other such CZT cells in order to reduce the number of connections required for a single X-ray detector cell 202.

Figure 8:
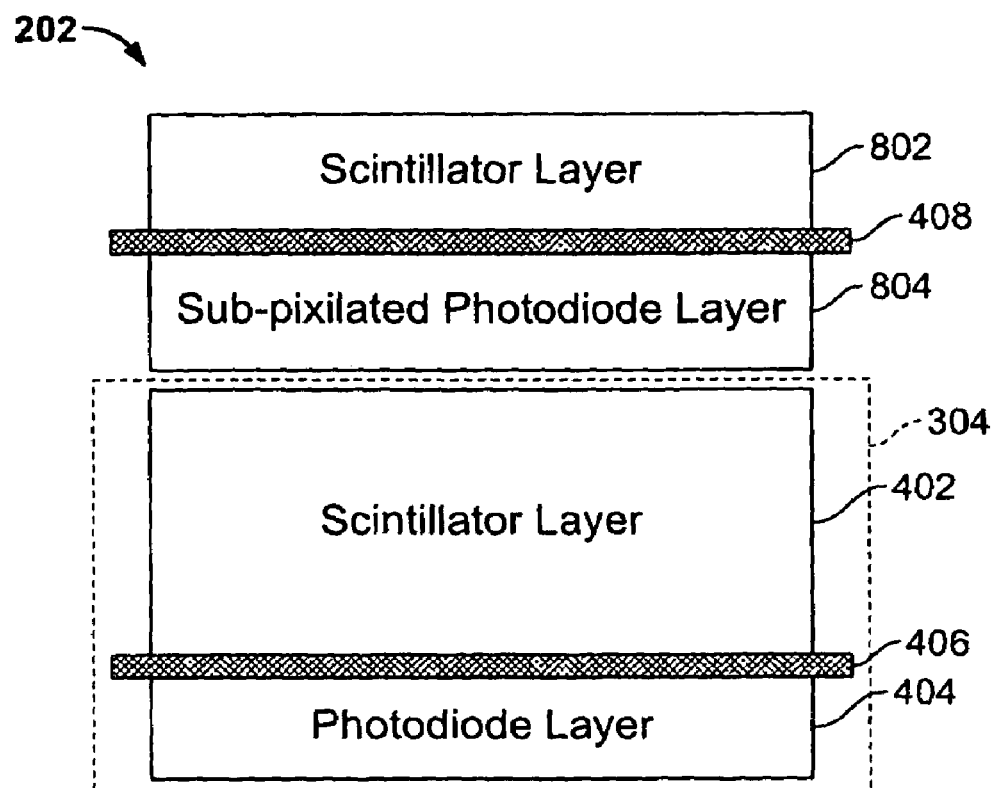
FIG. 8 is a block diagram of an X-ray detector cell in accordance with another exemplary embodiment of the invention.

FIG. 8 is a block diagram of an X-ray detector cell 202 in accordance with another exemplary embodiment of the invention. In this embodiment, a scintillator layer 802 coupled with a sub-pixelated photodiode layer 804 is used to form spatial resolution layer 302. Scintillator layer 802 is thin compared to scintillator layer 402. Hence, scintillator layer 802 absorbs only a small part of the X-rays that fall on its surface. However, scintillator layer 802 functions the same way as scintillator layer 402. Scintillator layer 802 is coupled with a sub-pixelated photodiode layer 804. Interconnection layer 408 connects the connectors of photodiode layer 804 with the data acquisition system. Because photodiode layer 804 is sub-pixelated, it provides high-resolution mapping of the X-rays falling on spatial resolution layer 302. In an alternate embodiment, scintillator layer 802 also can be sub-pixelated.

Figure 9:
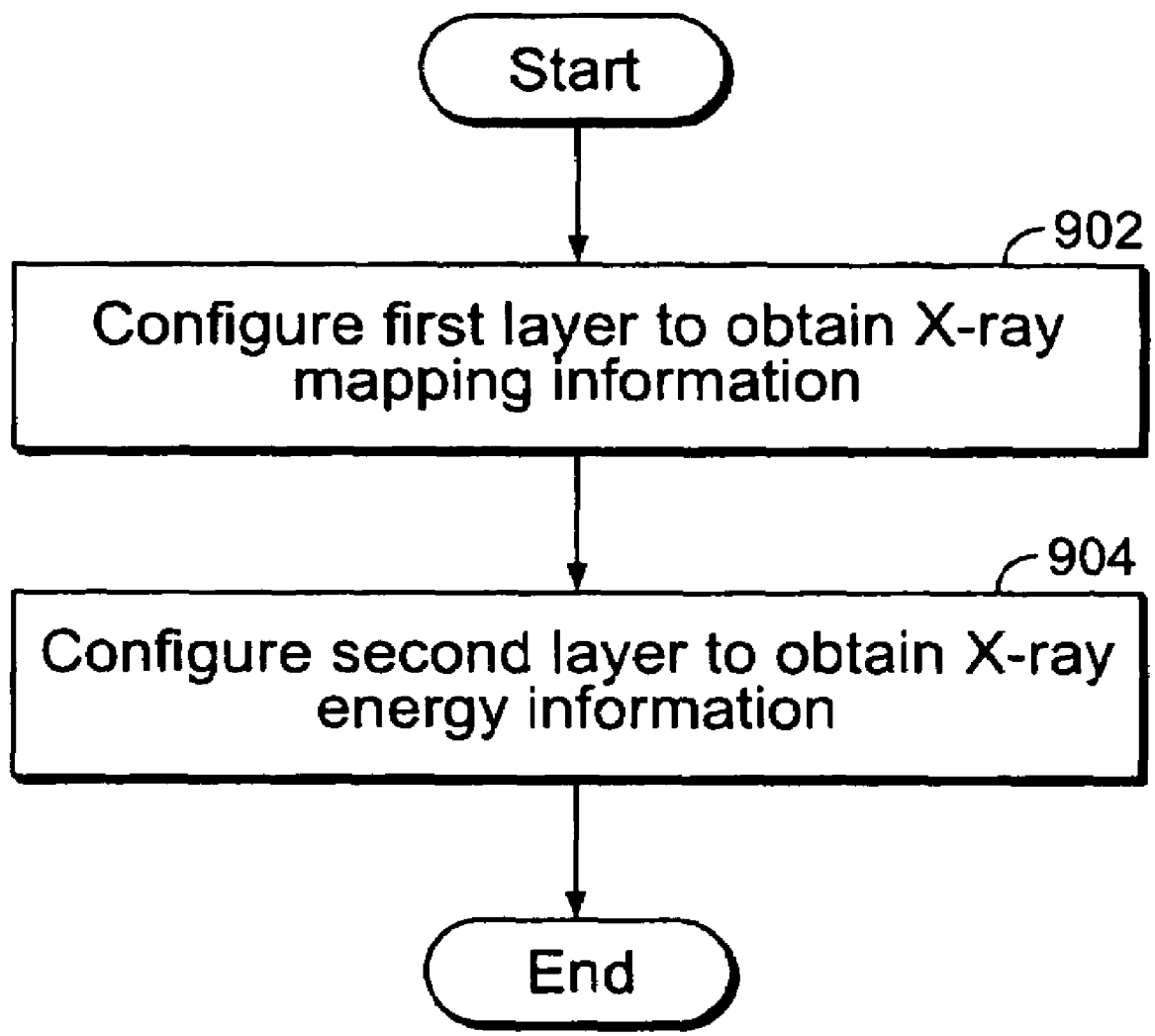
FIG. 9 is a flowchart of a method to control an X-ray imaging system in accordance with an exemplary embodiment of the invention.

X-ray imaging system 102 provides high-resolution images of an object being scanned by combining the information acquired by spatial resolution layer 302 and X-ray absorption layer 304. FIG. 9 is a flowchart of the method performed to control an X-ray imaging system 102 in accordance with an exemplary embodiment of the invention. At 902, a first detector layer is configured. The first detector layer may be spatial resolution layer 302. Spatial resolution layer 302 is configured to obtain X-ray mapping information about the object being scanned. This mapping includes collecting high resolution X-ray intensity variation information across and within an individual detector cell relating to the X-rays incident upon that cell. The X-ray mapping information provides the location of X-rays falling on the surface of spatial resolution layer 302. X-ray mapping information acquired by the sub-pixelated spatial resolution layer 302 is associated with the signal or charge detected in a second detector layer, for example, an X-ray absorption layer. At 904, the second detector layer is configured. The second detector layer may be X-ray absorption layer 304. X-ray absorption layer 304 is configured to obtain X-ray energy information. X-ray energy information includes the integration of the total charge from the X-rays falling on that cell for a period of time (referred to as 'a view' in CT). The X-ray energy information provides the intensity of the X-rays falling on the surface of X-ray absorption layer 304. X-ray imaging system 102 combines the X-ray mapping information with the X-ray energy information to generate an image of the scanned object. Multiple such images, obtained from different angles, may be combined to form a slice or a CT scan.

In an embodiment of the invention, X-ray imaging system 102 includes a plurality of spatial resolution layers 302. Each spatial resolution layer 302 has a different number of smaller cells and, hence, a different image resolution level. By combining the plurality of spatial resolution layers, a higher resolution image can be obtained. The plurality of spatial resolution layers are arranged sequentially one on top of the other along the X-ray penetration axis. In an embodiment of the invention, X-ray absorption layer 304 is placed in between two spatial resolution layers.

The location of spatial resolution layer 302 and X-ray absorption layer 304 may be changed with respect to the object to be imaged. For example, X-ray absorption layer 304 may be placed in between the object to be imaged and spatial resolution layer 302, along the X-ray penetration axis.

In an embodiment of the invention, X-ray imaging system 102 is a CT system. The CT system includes X-ray source 104 and X-ray detector 106. X-ray detector 106 further includes a plurality of X-ray detector cells 202. Each X-ray detector cell 202 includes a plurality of spatial resolution layers 302 and a plurality of X-ray absorption layers 304. Spatial resolution layer 302 is sub-pixelated and provides X-ray mapping information relating to the X-rays incident on it. X-ray absorption layer 304 provides X-ray intensity information relating to the X-rays incident on it.

The various embodiments of the invention provide an X-ray imaging system that is capable of obtaining high-resolution images of an object being scanned. The X-ray imaging system uses a layered structure. A first layer provides a high-resolution mapping of the location of X-rays and a second layer provides intensity information about the X-rays. Data from both the layers is combined to obtain a high-resolution image of the object. It should be noted that multiple additional layers configured similar to the first and second layers also may be provided.

Further, the various embodiments of the invention provide an X-ray imaging system that provides protection against overrange. Overrange is a condition in X-ray detector cells in which the intensity of the received X-ray on one X-ray detector cell is greater than the maximum allowable charge for that cell. Due to overrange, the X-ray detector cell provides an erroneous output. Because the X-ray imaging system uses multiple layers, even if a cell in the second layer overranges, the cells in the other layers capture partial information relating to the object being scanned. The X-ray imaging system also manages the interconnect density by using layers with reduced electrical connectors. The electrical output of the layers is multiplexed to reduce the number of electrical connectors required.

While the invention has been described in terms of various specific embodiments, those skilled in the art will recognize that the invention can be practiced with modification within the spirit and scope of the claims.

What is claimed is:

1. An X-ray imaging system comprising:
   an X-ray source for generating X-rays; and
   an X-ray detector configured to provide X-ray intensity variation information relating to the X-rays and corresponding to each of a plurality of detector cells of the X-ray detector, wherein a plurality of detecting layers comprise at least one spatial resolution layer and at least one X-ray absorption layer, the at least one spatial resolution layer absorbing substantially less of the X-rays than the at least one X-ray absorption layer and wherein the at least one spatial resolution layer is positioned between an object to be imaged and the at least one X-ray absorption layer, wherein the at least one spatial resolution layer is located within the detector cells, wherein the at least one spatial resolution layer is sub-pixelated, wherein the at least one spatial resolution layer is configured to obtain X-ray detection mapping information based on a sub-pixelation of the at least one spatial resolution layer, and wherein the X-ray imaging system is configured to associate the X-ray detection mapping information to sub-divide a signal detected by the at least one X-ray absorption layer.

2. An X-ray imaging system in accordance with claim 1 wherein the plurality of detecting layers are positioned along an X-ray penetration direction.

3. An X-ray imaging system in accordance with claim 1 wherein the at least one spatial resolution layer is configured to provide the X-ray detection mapping information corresponding to the plurality of detector cells.

4. An X-ray imaging system in accordance with claim 3 wherein the X-ray detection mapping information comprises X-ray intensity profile information over each of the plurality of detector cells and relating to the X-rays.

5. An X-ray imaging system in accordance with claim 1 wherein the at least one spatial resolution layer comprises at least one of a position sensitive diode, a silicon charge coupled device, a direct conversion semiconductor material portion, and a scintillator layer in combination with a sub-pixelated diode layer.

6. An X-ray imaging system in accordance with claim 1 further comprising a computed tomography (CT) scanner.

7. An X-ray imaging system in accordance with claim 1 wherein the X-ray detector comprises a plurality of detecting layers along an X-ray penetration direction and wherein a first layer provides mapping information for a second layer to provide mapping of X-ray intensity corresponding to each of the plurality of detector cells of the first layer.

8. An X-ray imaging system in accordance with claim 1 wherein the at least one spatial resolution layer absorbs between about one percent and about twenty-five percent of the X-rays.

9. A computed tomography (CT) system comprising:
   an X-ray source for generating X-rays;
   an X-ray detector having a plurality of detector cells for detecting the X-rays; and
   a plurality of detection layers in combination with the X-ray detector, wherein at least one of the plurality of detection layers comprises a sub-pixelated layer configured to provide X-ray mapping information relating to the X-rays and corresponding to each of the detector cells and at least another one of the plurality of detection layers comprises a pixelated layer configured to provide X-ray intensity information relating to the X-rays and corresponding to each of the plurality of detector cells, and wherein another sub-pixelated layer in combination with the sub-pixelated layer are on opposite sides of the pixelated layer and the sub-pixelated layers absorb substantially less of the X-rays than the pixelated layer.

10. A CT system in accordance with claim 9 wherein the sub-pixelated layer comprises at least one of a position sensitive diode, a silicon charge coupled device, a direct conversion semiconductor material portion, and a scintillator layer in combination with a sub-pixelated diode layer.

11. A CT system in accordance with claim 9 further comprising a collimator assembly and wherein the sub-pixelated layer is positioned between the pixelated layer and the collimator assembly.

12. A CT system in accordance with claim 9 further comprising a plurality of sub-pixelated layers each providing a different image resolution level.

13. A CT system in accordance with claim 9 wherein the plurality of detection layers are configured to provide information to generate an X-ray intensity variation profile for each of the plurality of detector cells.

14. A CT system in accordance with claim 9 wherein the plurality of detection layers are positioned along an X-ray penetration axis.

15. A CT system in accordance with claim 9 wherein the sub-pixelated layer comprises a spatial resolution portion and the pixelated layer comprises a scintillator/photodiode array.

16. A CT system in accordance with claim 9 wherein the sub-pixelated layer is positioned closer to an object to be imaged than the pixelated layer.

17. A method for controlling X-ray imaging, said method comprising:
    configuring at least a first layer and a second layer of a detector of an X-ray imaging system to provide X-ray intensity mapping information corresponding to each of a plurality of cells of the detector; and
    configuring at least a third layer of the detector to provide X-ray energy information, wherein the at least first layer and second layer absorb substantially less X-rays from an X-ray source than the at least third layer, with the third layer positioned between the first and second layers.

18. A method in accordance with claim 17 further comprising positioning the at least first layer closer to an object to be imaged than the at least second layer.

* * * * *